United States Patent [19]

Vaughn

[11] Patent Number: 5,171,649

[45] Date of Patent: Dec. 15, 1992

[54] CELL WITH ACTIVE METAL ELECTRODE AND MOLTEN SALT ELECTROLYTE

[75] Inventor: Robert L. Vaughn, Monument, Colo.

[73] Assignee: The United States of America as represented by the Secretary of the Air Force, Washington, D.C.

[21] Appl. No.: 652,707

[22] Filed: Jan. 31, 1991

[51] Int. Cl.$^5$ ............................................. H01D 10/39
[52] U.S. Cl. ............................ 429/112; 429/133; 429/198; 429/199
[58] Field of Search ................ 429/112, 133, 198, 199

[56] References Cited

U.S. PATENT DOCUMENTS

| | | | |
|---|---|---|---|
| 3,510,359 | 5/1970 | Selover et al. | 429/112 X |
| 3,751,298 | 8/1973 | Senderoff | 429/199 X |
| 4,002,492 | 1/1977 | Rao | 429/194 |
| 4,287,271 | 9/1981 | Coetzer et al. | 429/199 X |
| 4,463,071 | 7/1984 | Gifford et al. | 429/194 |
| 4,463,072 | 7/1984 | Gifford et al. | 429/194 |
| 4,544,615 | 10/1985 | Shishikura et al. | 429/194 |
| 4,668,596 | 5/1987 | Shacklette et al. | 429/194 |
| 4,764,440 | 8/1988 | Jones et al. | 429/198 |
| 4,804,594 | 2/1989 | Jow et al. | 429/194 |
| 4,882,244 | 11/1989 | Donahue et al. | 429/194 |

*Primary Examiner*—Stephen Kalafut
*Attorney, Agent, or Firm*—Thomas C. Stover; Donald J. Singer

[57] ABSTRACT

A high voltage electrochemical cell is provided which includes an active metal as anode, such as sodium, a mixture of a transition metal halide or sulfide, e.g. $CuCl_2$ and graphite as the cathode and an electrolyte of a room temperature chloroaluminate molten salt such as MEIC-AlCl$_3$ buffered to Lewis acid-base neutrality by an excess of metal halide, such as NaCl, to provide a discharge potential or open-circuit voltage of up to 2.78 V or more. The battery cell of the present invention is believed the first to use sodium as an active metal anode in a room temperature, molten salt electrolyte. The battery cell of the present invention is useful for long-life, low drain applications, e.g. remote sensors and surveillance equipment.

15 Claims, 1 Drawing Sheet

CELL WITH ACTIVE METAL ELECTRODE AND MOLTEN SALT ELECTROLYTE

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to an electrochemical cell having a molten salt electrolyte, particularly a cell which also has an active metal electrode therein.

2. The Prior Art

Present day electrochemical cells which employ molten salt electrolytes, operate at temperatures from 200° C. to 600° C. Such high temperatures cause material failures due to the harsh environment. Such batteries also require large amounts of insulation and complex thermal controls.

In the recent past, attention has been directed to reduced temperature molten salts. Thus chloroaluminate molten salts are mixtures of aluminum chloride and a chloride donor, which is usually an alkali metal chloride or organic chloride. The most studied chloroaluminate molten salts are the mixtures of $NaCl/AlCl_3$, $BPC/AlCl_3$ and $MEIC/AlCl_3$, where BPC is 1-(1-butyl) pyridinium chloride and MEIC is 1-methyl-3-ethylimidzolium chloride. The latter two binary molten salts have the advantage of having compositions with melting points below room temperature, i.e. they are room temperature molten salts or ionic liquids.

In one example, 1-methyl-3-ethylimidazolium chloride and aluminum chloride, herein $MEIC-AlCl_3$, many of the physical, chemical and electrochemical properties of the molten salt, depend on the composition, i.e. the relative proportions of MEIC and $AlCl_3$. The maximum voltage that a battery cell can deliver is determined by the decomposition potentials of the electrolyte. The difference between the anodic and cathodic decomposition limits is called the electrochemical window of the electrolyte.

The window in the $MEIC-AlCl_3$ melts depends on the chemical species present, which is determined by the composition thereof. The value for the molten salts is about 2.4V, compared with about 1.5V for water-based electrolytes. While 2.4V is a good window, the $MEIC-AlCl_3$ molten salts have a particular composition where the window expands to 4.5V.

However, such wide window point, e.g. where MEIC and $AlCl_3$ are equal, at 50 mole fraction each (called the neutral point) had been difficult to maintain until a recent invention which is disclosed in a patent application entitled; *Method And Composition For Chloroaluminate Molten Salts Having A Wide Electrochemical Window*, issued as U.S. Pat. No. 5,096,789 on Mar. 17, 1992, by J. S. Wilkes et al., which disclosure is incorporated herein by reference.

That invention relates to a method for obtaining and maintaining a wide electrochemical window in chloroaluminate molten salts by adding to such molten salts, (where mole fraction $AlCl_3$:MEIC is greater than or equal to 1:1), an alkali metal chloride salt, e.g. NaCl, to buffer such molten salts to a Lewis acid-base neutrality.

The present invention makes use of such reduced temperature (wide window) molten salts in constructing a reduced temperature electrochemical cell of relatively high voltage. That is, the applicant employs an active metal as the anode in a battery cell that contains the above buffered molten salt electrolye, as more fully discussed below.

In related prior art, U.S. Pat. No. 4,463,071 to Gifford et al (1984), relates to the use of chloroaluminate molten salts as electrolytes with the addition of alkali metal salts, including NaCl, to such electrolytes. However the Gifford reference discloses such salts as a source of active metal ion for insertion into their electrodes during cell operation (Col. 2, lines 18–21 and Col. 6, lines 15 and 16). That is, Gifford's anode will not function without such cation supply.

The present invention, however, adds alkali metal chloride to choroaluminate molten salts for a different purpose, to buffer them into wide window neutrality, as discussed above. Further, an anode of active metal is employed in the battery cell of the present invention.

In other prior art, U.S. Pat. No. 4,463,072, to Gifford et al (1984) and U.S. Pat. No. 4,882,244, to Donahue et al. (1989), disclose metal anodes in acidic electrolytes. In such electrolytes active metals chemically react to the point of distraction and are thus not suitable.

Accordingly, there has now been discovered a battery cell that makes what is believed the first use of an active metal as the anode therein, which contains a reduced-temperature molten salt electrolyte. The use of such active metal anode results in a higher voltage at, e.g. room temperature, than for any other known cell containing a molten salt electrolyte.

SUMMARY OF THE INVENTION

Broadly the present invention provides an electrochemical cell comprising, an active metal as anode, a mixture of a transition metal halide or sulfide and graphite as the cathode, and an electrolyte of chloroaluminate molten salt buffered to Lewis acid-base neutrality by a metal halide.

In one embodiment, the anode is of sodium metal, the cathode is a mixture of $CuCl_2$ [Copper (II) chloride] and graphite in a metal mesh current collector and the electrolyte is a mixture of $MEIC-AlCl_3$, buffered to Lewis acid-base neutrality by an excess of NaCl to provide voltage of up to 2.78V or more.

By "reduced temperature" as used herein, is meant battery operating temperatures below 200° C. including below 100° C., to room temperature of 20° C. or below.

BRIEF DESCRIPTION OF THE DRAWINGS

The invention will become apparent from the following detailed specification and drawings in which.

DESCRIPTION OF PREFERRED EMBODIMENTS

Figure 1:
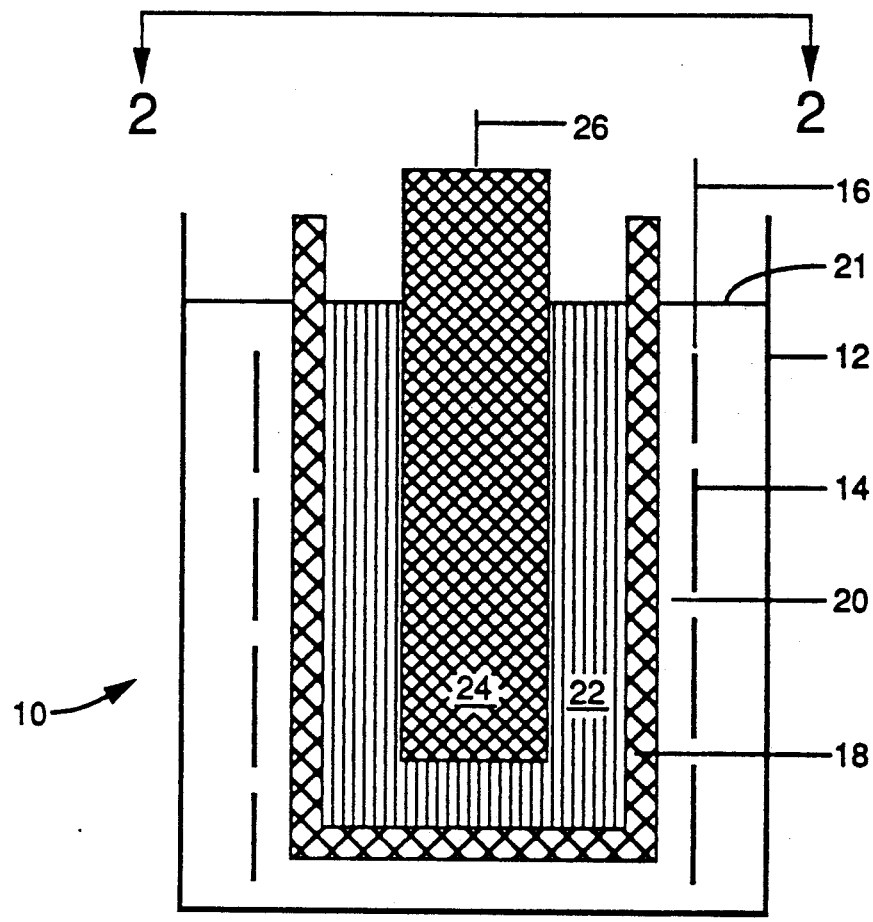
FIG. 1 is a sectional elevation schematic view of a battery cell embodying the present invention and FIG. 2 is a cross-sectional plan view of the battery cell embodiment of FIG. 1, taken on lines 2—2, looking in the direction of the arrows.
Figure 2:
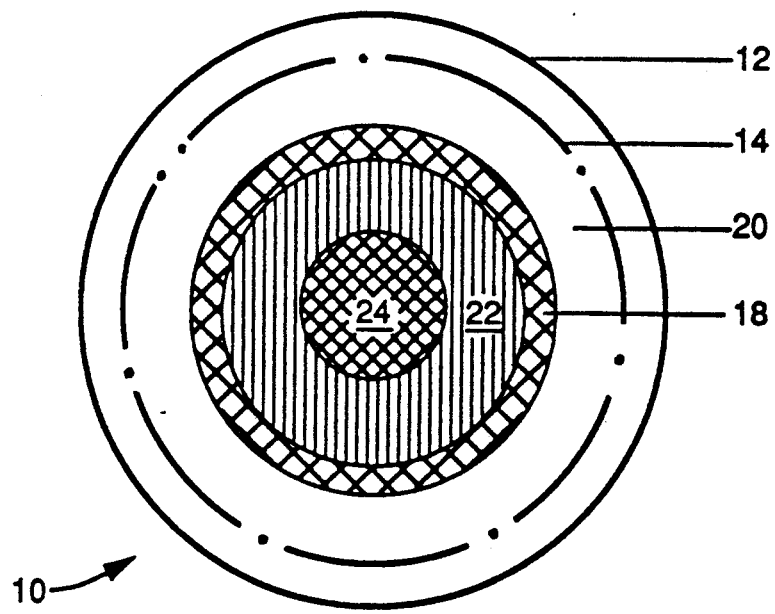

Referring to the invention in more detail, shown is a battery cell 10, having a container 12, in which is mounted a copper mesh current collector 14, as shown in FIGS. 1 and 2. Part of the mesh is twisted into a wire to serve as a cell connection 16, as shown in FIG. 1. A borosilicate glass tube 18, is placed in the center of the cell 10 and a dry cathode mixture 20, e.g. copper(II)-chloride, is poured around the outside of the tube 18, tamping after each small addition of the cathode mixture powder. Enough cathode mixture is added to cover the copper mesh current collector 14. Electrolyte 22 is added into the glass tube 18 to soak through such tube and into the cathode mixture 20, shown in FIGS. 1 and 2. Enough electrolyte is so added that after the cathode mixture has become thus saturated, the level of the electrolyte is even with the top of such cathode mixture 20, i.e. at line 21, shown in FIG. 1, once an anode is added thereto. Such anode is a cast sodium rod 24, having an embedded tungsten wire 26, therein, as shown in FIGS. 1 and 2.

The invention thus includes a cell with a housing of, e.g. cylindrical shape with a cast sodium anode therein, surrounded by electrolyte, a borosilicate glass tube and an electrolyte saturated cathode mixture, having a metal current collector therein, as described above. Preferably the electrolyte is a mixture of 1-methyl-3-ethylimidazolium chloride and aluminum chloride or MEIC-AlCl$_3$, buffered to neutral composition by the addition of a metal halide, e.g. NaCl, as described in the above referenced patent application by John S. Wilkes et al, previously incorporated herein by reference.

The battery cell of the present invention uses materials that are commonly available, easy to work with and are relatively inexpensive. Such cell operates at ambient temperatures yet retains many of the advantages of molten salts without the high temperatures that cause material failures per the prior art. The use of sodium is believed the first use of an active metal in a room temperature, molten salt electrolyte.

The following example is given to illustrate the invention and should not be construed in limitation thereof.

EXAMPLE I

A battery cell was constructed that included a sodium anode, and a CuCl$_2$ cathode in an electrolyte (melt) of MEIC-AlCl$_3$ (0.55 mole fraction AlCl$_3$), which was buffered by adding 10% excess NaCl thereto. A dry mixture of copper (II) chloride and graphite (50 wt. %) was added around the the glass tube. The tube was filled with electrolyte which was allowed to soak through the tube walls and saturate the cathode mixture.

A solid sodium anode with a tungsten current collector was immersed in the electrolyte. Based on an overall cell reaction:

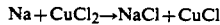
Na+CuCl$_2$→NaCl+CuCl the therodynamic potential is 3.55V with a theoretical energy density of 604 Wh/kg. The open circuit voltage observed for this cell was 2.78V. Voltage-current data indicated an internal cell resistance of 66.7 ohms at loads less than 3.2 mA. The cell was discharged at currents up to 3 mA (0.75 mA/cm$^2$).

More specifically, such cell was discharged at 1 mA for 150 minutes. When left on open circuit, such voltage recovered and the cell was subsequently discharged at 2 mA, for 67 hours. Such cell was subsequently discharged repeatedly after voltage recovery on open circuit.

Subsequent cells were discharged at 3 mA constant current (0.75 mA/cm$^2$), delivering up to 30% of theoretical capacity when cell voltage reached 1V.

Any transition metal halide or sulfide, especially those of Iron (III), Molybdenum (VI) and Titanium (IV) can be suitable for the active cathode material.

Active metals of Groups I and II can serve as anodes when the electrolyte has been buffered with the appropriate metal halide.

Theoretical voltages and energy densities for alternative battery couples are given in the following table:

TABLE I

| Couple | Equation | E°(V) | E.D. (Wh/kg) |
|---|---|---|---|
| Li/Cu | Li + CuCl→LiCl + Cu | 2.761 | 776.3 |
| Li/Ag | Li + AgCl→LiCl + Ag | 2.847 | 506.4 |
| Na/Cu | Na + cuCl→NaCl + Cu | 2.757 | 600.9 |
| Na/Ag | Na + AgCl→NaCl + Ag | 2.843 | 458.2 |
| K/Cu | K + CuCl→KCl + Cu | 3.009 | 558.2 |
| K/Ag | K + AgCl→CKl + Ag | 3.095 | 454.7 |
| Be/Cu | Be + 2CuCl→BeCl$_2$ + 2Cu | 1.106 | 289.4 |
| Be/Ag | Be + 2AgCl→BeCl$_2$ + 2Ag | 1.192 | 216.1 |
| Mg/Cu | Mg + 2CuCl→MgCl$_2$ + 2Cu | 1.853 | 450.9 |
| Mg/Ag | Mg + 2AgCl→MgCl$_2$ + 2Ag | 1.932 | 333.1 |
| Ca/Ag | Ca + 2AgCl→CaCl$_2$ + 2Ag | 2.900 | 658.7 |
| Ca/Cu | Ca + 2CuCl→CaCl$_2$ + 2Cu | 2.983 | 489.3 |
| Ba/Cu | Ba + 2CuCl→BaCl$_2$ + 2Cu | 2.979 | 479.0 |
| Ba/Ag | Ba + 2AgCl→BaCl$_2$ + 2Ag | 3.065 | 387.4 |
| Na/Cu | 2Na + CuS→Na$_2$S + Cu | 1.56 | 590.7 |
| K/Cu | 2K + CuS→K$_2$S + Cu | 1.60 | 481.2 |

Thus, as noted above, the cell of the invention employs an actve metal anode in a room temperature molten salt electrolyte and gives a high voltage. Battery cells of the present invention can be used for long life, low drain applications such as remote sensors, surveillance equipment and as back-up power for electronic equipment.

What is claimed is:

1. A battery cell comprising, an unalloyed active metal as anode, a mixture of graphite and a compound selected from the group consisting of a transition metal halide and sulfide as cathode and an electrolyte of chloroaluminate molten salt buffered to Lewis acid-base neutrality by a metal halide.

2. The cell of claim 1 wherein said anode is an active metal selected from the group consisting of Li, Na, K, Be, Mg, Ca and Ba.

3. The cell of claim 1 wherein said cathode includes a metal mesh current collector.

4. The cell of claim 1 wherein said electrolyte is a molten salt above and below 20° C.

5. The cell of claim 1 wherein said electrolyte is MEIC-AlCl$_3$ buffered with a sodium halide.

6. The cell of claim 2 wherein said electrolyte is MEIC-AlCl$_3$ buffered with a halide salt of the active metal anode.

7. The cell of claim 1 wherein the anode and cathode have a porous separator interposed therebetween.

8. The cell of claim 7 wherein said separator is a borosilicate tube, said anode is inserted within said tube and said cathode contacts the exterior of said tube.

9. The cell of claim 8 wherein said electrolyte is in said tube, through said tube and soaked into said cathode.

10. The cell of claim 1 wherein said cathode is a mixture of CuCl$_2$ and graphite.

11. The cell of claim 2 which includes a reaction selected from the group consisting of:

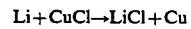
Li+CuCl→LiCl+Cu

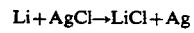
Li+AgCl→LiCl+Ag

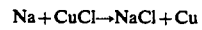
Na+CuCl→NaCl+Cu $Na + AgCl \rightarrow NaCl + Ag$ $K + CuCl \rightarrow KCl + Cu$ $K + AgCl \rightarrow KCl + Ag$ $Be + 2CuCl \rightarrow BeCl_2 + 2Cu$ $Be + 2AgCl \rightarrow BeCl_2 + 2Ag$ $Mg + 2CuCl \rightarrow MgCl_2 + 2Cu$ $Mg + 2AgCl \rightarrow MgCl_2 + 2Ag$ $Ca + 2AgCl \rightarrow CaCl_2 + 2Ag$ $Ca + 2CuCl \rightarrow CaCl_2 + 2Cu$ $Ba + 2CuCl \rightarrow BaCl_2 + 2Cu$ $Ba + 2AgCl \rightarrow BaCl_2 + 2Ag$ $2Na + CuS \rightarrow Na_2S + Cu$ and $2K + CuS \rightarrow K_2S + Cu$ 12. The cell of claim 1 wherein said chloroaluminate molten salt includes aluminum chloride and an organic chloride salt.

13. The cell of claim 12 wherein the electrolyte includes $AlCl_3$ at a mole fraction of 0.50 or more and an excess of alkali metal halide added thereto to buffer said electrolyte to said neutrality.

14. The cell of claim 11 wherein said cathode includes a transition metal halide selected from the group consisting of CuCl and AgCl.

15. The cell of claim 5 which includes the reaction of $Na + CuCl_2 \rightarrow NaCl + CuCl$ and provides an open circuit voltage of up to 2.78V or more.

* * * * *